2,990,415
9-SUBSTITUTED Δ⁴-ANDROSTENES

Seymour Bernstein, Pearl River, N.Y., and Robert H. Lenhard, Ridgefield Park, N.J., assignors to American Cyanamid Company, New York, N.Y., a corporation of Maine
No Drawing. Filed Mar. 29, 1955, Ser. No. 497,808
1 Claim. (Cl. 260—397.45)

This invention relates to new steroid compounds. More particularly, it relates to 9-alpha-substituted-Δ⁴-androstenes and methods of preparation thereof.

It has been known in the past that certain halogenated steroids may be prepared by the halogenation of the steroid moiety. Steroids having halogen groups in the 3, 5, 6, and 7 positions are known. The prior art does not disclose any 9-alpha-halogen or -hydroxy-androstenes.

We have now found that the 9-alpha-halogen or -hydroxy-androstenes have estrogenic activity and electrolyte activity and can be used in the treatment of those conditions where estrogen or electrolyte (sodium retention) effect is desirable. These compounds can be illustrated by the following general formula

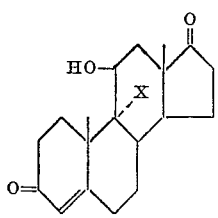

in which X is a halogen or hydroxyl radical.

The compounds of the present invention are solids having a relatively high melting point. They are soluble in the usual organic solvents and comparatively insoluble in water.

The present compounds are prepared from $\Delta^{4,9(11)}$-androstadiene 3,17-dione by hypobromous acid to produce the corresponding 9α-bromo-11β-hydroxy-androstene, which on heating with an alkali metal acetate produces the corresponding 9β,11β-oxide of Δ⁴-androstene-3,17-dione. The latter oxide can be treated with hydrogen chloride, hydrogen fluoride, perchloric acid, sulfuric acid and the like to produce the various compounds of the invention.

In carrying out the final step of the present reaction wherein the Δ⁴-androstene-3,17-dione-9β,11β-oxide is reacted with the hydrohalogen, perchloric acid, or sulfuric acid, the reaction takes place at a temperature of from 0° to 30° C. The reaction is preferably carried out in a solvent such as chloroform, tetrahydrofuran and the like. The reaction is usually complete within a period of from 1 to 6 hours.

The following examples describe in detail the process of preparing 9α-halo- or -hydroxy-Δ⁴-androstene-3,17-diones.

Example 1

A solution of $\Delta^{4,9(11)}$-androstadiene-3,17-dione (1.0 g.) in dioxane (50 ml.) and water (10 ml.) was cooled to 15° C., treated with N-bromoacetamide (1.07 g.) and 71% perchloric acid (10 dps.), and allowed to stand at room temperature (25° C.) for one hour. Excess aqueous sodium sulfite and water was added to the yellow solution and after cooling, the product Δ⁴-androstene-9α-bromo-11β-ol-3,17-dione was filtered and washed with water, 1.07 g., melting point 168–168.5° dec. with previous browning.

The above product was purified for characterization by crystallization from acetone, petroleum ether, melting point 171.5–172° dec. with previous browning; ultraviolet spectrum:

$\lambda_{max.}^{abs. alc.}$ 242.5 mμ (ε 16,200); $[\alpha]_D^{24}$ +190° (chloroform)

Example 2

A solution of the bromohydrin of Example 1 (100 mg.) in absolute alcohol (20 ml.) containing anhydrous potassium acetate (100 mg.) was refluxed for 46 hours. The reaction mixture was evaporated to dryness under reduced pressure and the residue dissolved in ethyl acetate, washed, dried, and re-evaporated to dryness. Crystallization from acetone-petroleum ether afforded 65 mg. of Δ⁴-androstene-3,17-dione-9β,11β-oxide, melting point 178–180° with previous softening. Three crystallizations from acetone-petroleum ether gave 51 mg. of pure oxide, melting point 181–182° with previous softening; ultraviolet spectrum:

$\lambda_{max.}^{abs. alcohol}$ 242.5–243 mμ (ε14,000); $[\alpha]_D^{24}$ +38° (chloroform)

The oxide immediately above (300 mg.) in alcohol-free chloroform (3 ml.) was treated with anhydrous hydrogen chloride in alcohol-free chloroform (25 ml.) and allowed to stand at 0° for 4½ hours. The yellow solution was evaporated under reduced pressure at 0° C. to a crystalline solid. Crystallization from acetone-petroleum ether gave 258 mg. of product, melting point 327.5–240° dec. with previous softening. Three crystallizations from acetone-petroleum ether gave 161 mg. of pure Δ⁴-androstene-9α-chloro-11β-ol-3,17-dione, melting point 243.5–245.5° dec. with previous softening; ultraviolet spectrum: $\lambda_{max}$ 240 mμ (ε 17,200); $[\alpha]_D^{25}$ +194° (chloroform).

Example 3

A solution of the oxide of Example 2 (300 mg.) in alcohol-free chloroform (25 ml.) was treated with anhydrous hydrogen fluoride and allowed to stand at 0° C. for 4½ hours. The solution was evaporated to dryness at room temperature and the residue dissolved in ethyl acetate. After washing with dilute sodium bicarbonate and water, the dried extract was treated with activated charcoal, filered through diatomaceous earth and evaporated under reduced pressure to a slightly yellow solid which was crystallized from acetone-petroleum ether to afford 120 mg. of product, Δ⁴-androstene-9α-fluoro-11β-ol-3,17-dione, melting point 206–207° dec. Four crystallizations from acetone-petroleum ether gave 97 mg. of pure fluorohydrin, melting point 249.5–250° dec.; ultraviolet spectrum: $\lambda_{max}$ 238 mμ (ε 17,200); $[\alpha]_D^{25}$ +184° (chloroform).

Example 4

A solution of the oxide of Example 2 (300 mg.) in tetrahydrofuran (6 ml.) and 3 N perchloric acid (2 ml.) was allowed to stand at room temperature for 5½ hours. After adding water and salt to the yellow reaction mixture, the product was extracted with ethyl acetate and washed with saturated sodium bicarbonate solution and saline. The dried extract was evaporated under reduced pressure, and the residue crystallized from acetone-petroleum ether to give 174 mg. of product Δ⁴-androstene-9α,11β-diol-3,17-dione, melting point 242.5–246.5° with previous softening. Two crystallizations from acetone-petroleum ether gave 158 mg. of practically pure diol, melting point 248.5–250.5° with previous softening.

The product prepared by a similar method was purified for characterization by crystallization from acetone-petroleum ether, melting point 249.5–250.5° with previous softening; ultraviolet spectrum: $\lambda_{max}$ 241–242 m$\mu$ ($\epsilon$ 15,500); $[\alpha]_D^{25}$ +223° (chloroform).

We claim:

The compound $\Delta^4$-androstene-9 alpha, 11 beta-diol-3, 17-dione.

References Cited in the file of this patent

UNITED STATES PATENTS 2,707,190  Farrar _____ Apr. 26, 1955

OTHER REFERENCES

Fieser and Fieser: Natural Products Related to Phenanthrene, 1949, page 424.